United States Patent [19]
D'Alelio

[11] 3,890,272
[45] June 17, 1075

[54] POLYMERIZING BIS-MALEIMIDES

[75] Inventor: Gaetano Francis D'Alelio, South Bend, Ind.

[73] Assignee: University of Notre Dame du Lac, South Bend, Ind.

[22] Filed: May 25, 1973

[21] Appl. No.: 363,799

[52] U.S. Cl....... 260/47 UA; 117/128.4; 117/161 P; 161/227; 260/47 CZ; 260/47 CP; 260/63 N; 260/65; 260/78 TF; 260/78 UA
[51] Int. Cl............................................ C08g 20/32
[58] Field of Search....... 260/47 CZ, 78 TF, 78 UA, 260/47 U, 65, 47 CP:63 N

[56] References Cited
UNITED STATES PATENTS

| | | | |
|---|---|---|---|
| 3,533,996 | 10/1970 | Grundschober et al. | 260/47 |
| 3,576,691 | 4/1971 | Meyers | 156/309 |
| 3,380,964 | 4/1968 | Grundschober et al. | 260/47 |
| 3,671,490 | 6/1972 | Bargain | 260/47 |

*Primary Examiner*—Lester L. Lee
*Attorney, Agent, or Firm*—Robert W. Black

[57] ABSTRACT

Processes for preparing polyimides from bis-maleimides are provided. In these processes, a bis-maleimide is polymerized in the presence of a catalytic amount (usually about 0.01 to 5% by weight of the bis-maleimide) of an alkali metal salt of a Brönsted acid. Preferably, the polymerization is also conducted in the presence of a small amount (usually 0.01 to 5% by weight of the bis-maleimide) of an activator for the catalyst. The activator is an aprotic organic compound having a dielectric constant between about 35 and 45. Melt polymerization is preferred at a preferred temperature of 150° to 275°C.

21 Claims, No Drawings

POLYMERIZING BIS-MALEIMIDES

BACKGROUND OF THE INVENTION

1. Field of Invention

This invention relates to processes for preparing polyimides and more particularly to processes for preparing polyimides obtained from bis-maleimides.

2. Prior Art

The preparation of heat-resistant polyimides obtained by reacting bis-maleimides and diamines in polar solvents is known in the prior art. British Pat. No. 1,280,846 describes an improvement on this process in which the reaction is carried out in the presence of a strong acid or of an inhibitor of free radicals. Polyimides derived from bismaleimides give off very little by-products when cured; however, they tend to be more brittle and have a lower thermal oxidative stability than aromatic polyimides derived from the condensation reaction of an aromatic dianhydride and aromatic diamine.

The polymerization of N-phenyl-maleimide with sodium salts of Brönsted acids in dimethylformamide is described by Koichi Yamaguchi and Yuji Minoura in Journal of Polymer Science: Part A-1, Vol. 8 (1970) pages 1571–1586. Polymers resulting from this polymerization are of low molecular weight.

SUMMARY OF THE INVENTION

According to the present invention there is provided a process for converting a bis-maleimide of the formula:

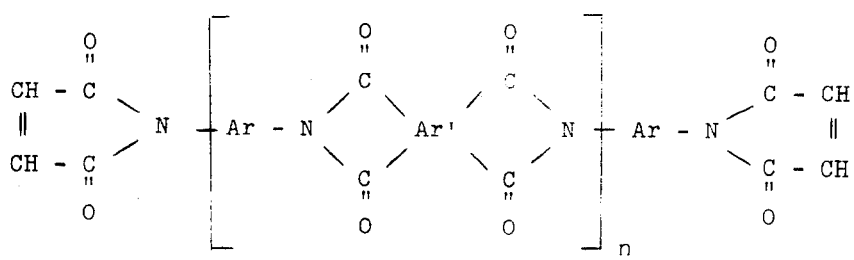

wherein Ar is a divalent aromatic organic radical,

Ar' is a tetravalent aromatic organic radical, the four carbonyl groups being attached directly to separate carbon atoms and each pair of carbonyl groups being attached to adjacent carbon atoms in the Ar' radical, and $n$ is O or a positive integer of 1 to 20, to a high molecular weight polymer comprising: polymerizing said bis-maleimide in the presence of a catalytic amount of an alkali metal salt of a Brönsted acid, said alkali metal salt of a Brönsted acid selected from the group consisting of an alkali metal salt of an organic Brönsted acid having a $pk_a$ in the range of about 4 to 6, an alkali metal cyanide and an alkali metal carbonate.

DETAILED DESCRIPTION OF THE INVENTION

Bis-maleimides are prepared, as is known in the art, by the reaction of maleic anhydride and a diamine. The bismaleimides used in the present process can be prepared as known in the art or by the azeotroping process described in my copending application Ser. No. 363800 filed May 25, 1973. The bis-maleimides useful in the present invention have the structural formula

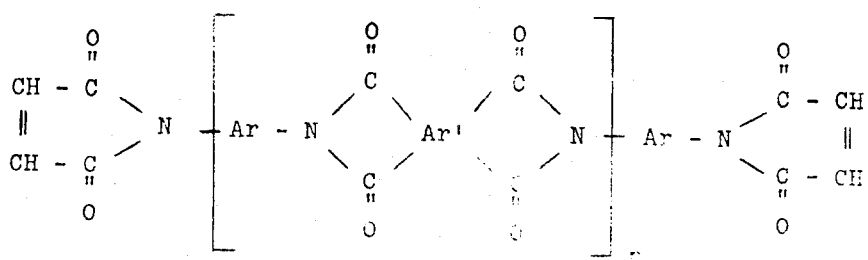

wherein Ar is a divalent aromatic organic radical,

Ar' is a tetravalent aromatic organic radical, the four carbonyl groups being attached directly to separate carbon atoms and each pair of carbonyl groups being attached to adjacent carbon atoms in the Ar' radical, and $n$ is O or a positive integer of 1 to 20.

The divalent aromatic radical Ar and the tetravalent aromatic radical Ar' can be any of the radicals described in polyimide patents known in the art that are derived from an aromatic diamine and an aromatic dianhydride respectively. Ar' preferably contains at least one ring of six carbon atoms characterized by benzenoid unsaturation. Any of the aromatic tetracarboxylic acid dianhydrides known in the prior art can be used to provide Ar'. Among the useful dianhydrides are 3,3',4,4'-benzophenonetetracarboxylic acid dianhydride, pyromellitic dianhydride, 2,3,6,7-naphthalene tetracarboxylic acid dianhydride, 3,3',4,4'-diphenyl tetracarboxylic acid dianhydride, 1,2,5,6-naphthalene tetracarboxylic acid dianhydride, 2,2',3,3'-diphenyl tetracarboxylic acid dianhydride, 2,2-bis(3,4-dicarboxyphenyl)propane dianhydride, 3,4,9,10-perylene tetracarboxylic acid dianhydride, bis(3,4-dicarboxyphenyl)ether dianhydride, naphthalene-1,2,4,5-tetracarboxylic acid dianhydride, naphthalene-1,4,5,8-tetracarboxylic acid dianhydride, decahydronaphthale-

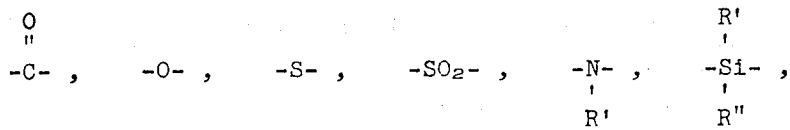

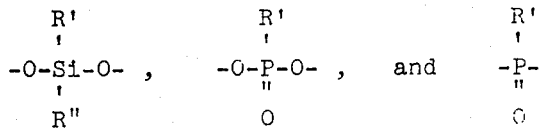

wherein R' and R'' are each selected from the group consisting of alkyl and aryl of 1 to 6 carbon atoms. Ar is preferably

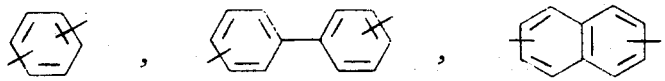

and 

where R is

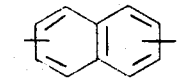

—O—, —S—, —CH=CH— and —SO₂—.

Examples of aromatic diamines which are suitable to provide Ar are 4,4'-diaminodiphenyl propane, 4,4'-diaminodiphenyl methane, benzidine, 3,3'-dichlorobenzidene, 4,4'-diamino-diphenyl sulfide, 3,3'-diamino-diphenyl sulfone, 4,4'-diamino-diphenyl sulfone, 4,4'-diaminodiphenyl ether, 1,5-diamino naphthalene, 4,4'-diaminodiphenyl diethylsilane, 4,4'-diamino-diphenyl diphenylsilane, 4,4'-diaminodiphenyl ethyl phosphine -diaminodiphenylmethane, 4,4'-diaminodiphenyl phenyl phosphine oxide, 4,4'-diamino-diphenyl N-methyl amine, 4,4'-diaminodiphenyl N-phenyl amine and mixtures thereof. 3,3'-dimethyl-4,4'-diaminodiphenylmethane, 3,3'-diethyl-4,4'-diaminodiphenylmethane, 3,3'-dimethoxy-4,4'-diaminodiphenylmethane, 3,3'-diethoxy-4,4'-dianinodiphenylmethane, 3,3'-dichloro-4,4',4,4'-diaminodiphenylmethane, 3,3'-dibromo-4,4'-diaminodiphenylmethane, 3,3'-dicarboxy-4,4'-diaminodiphenylmethane, 3,3'-dihydroxy-4,4'-diaminodiphylmethane, 3,3'-disulpho-4,4'-diaminodiphenylmethane, 3,3'-dimethyl-4,4'- ne-1,4,5,8-tetracarboxylic acid dianhydride, 4,8-dimethyl-1,2,3,5,6,7-hexahydronaphthalene-1,2,5,6-tetracarboxylic acid dianhydride, 2,6-dichloronaphthalene-1,4,5,8-tetracarboxylic acid dianhydride, 2,7-dichloronaphthalene- 1,4,5,8- tetracarboxylic acid dianhydride, 2,3,6,7-tetrachloronaphthalene-1,4,5,8-tetracarboxylic acid dianhydride, phenanthrene-1,8,9,10-tetracarboxylic acid dianhydride, cyclopentane-1,2,3,4-tetracarboxylic acid dianhydride, purrolidine-2,3,4,5-tetracarboxylic acid dianhydride, pyrazine-2,3,5,6-tetracarboxylic acid dianhydride, 2,2-bis( 2,3-dicarboxyphenyl)propane dianhydride, 1,1-bis(2,3-dicarboxyphenyl)ethane dianhydride, 1,1-bis-(3,4-dicarboxyphenyl)ethane dianhydride, bis(2,3-dicarboxyphenyl)methane dianhydride, bis(3,4-dicarboxyphenyll)methane dianhydride, bis(3,-4-dicarboxyphenyl)sulfone dianhydride, benzene-1,2,3,4-tetracarboxylic acid dianhydride and thiophene-2,3,4,5-tetracarboxylic acid dianhydride. Preferred Ar' radicals are

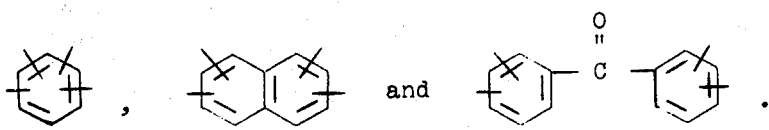

Ar is a divalent benzenoid radical selected from the group consisting of

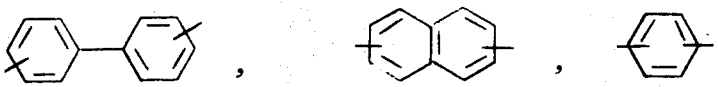

and multiples thereof connected to each other by R, for example,

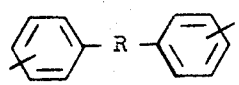

wherein R is an alkylene chain of 1–3 carbon atoms, —CH=CH—, diaminodiphenylether, 3,3'-diethyl-4,4'-diaminodiphenylether, 3,3'-dimethoxy-4,4'-diaminodiphenylether, 3,3'-diethoxy-4,40-diaminodiphenylether, 3,3'-dichloro-4,4'-diaminodiphenylether, 3,3'-dibromo-4,4'-diamino diphenylether, 3,3'-dicarboxy-4,4'-diaminodiphenylether, 3,3'-dihydroxy-4,4'-diaminodiphenylether, 3,3'-disulfo-4,4'-diaminodiphenylether, 3,3'-dimethyl-4,4'-diaminodiphenylsulfide, 3,3'-diethyl-4,4'-diaminodiphenylsulfide, 3,3'-dimethoxy- 4,4'-diaminodiphenylsulfide, 3,3'-diethoxy-4,4'-diaminodiphenylsulfide, 3,3'-dichloro-4,4'-diaminodiphenylsulfide, 3,3'-dichloro-4,4'-diaminophenylsulfide, 3,3'-dibromo-4,4'-diaminodiphenylsulfide, 3,3'-dicarboxyl-4,4'-diaminodiphenylsulfide, 3,3'-dihydroxy-4,4'-diaminodiphenylsulfide, 3,3'-disulfo-4,4'-diaminodiphenylsulfide, 3,3'-dimethyl-4,4'-diaminodiphenylsulfone, 3,3'-diethoxy-4,4'-diaminodiphenylsulfone, 3,3'-dichloro-4,4'-diaminodiphenylsulfone, 3,3'-dicarboxy-4,4'-diaminodiphenylsulfone, 3,3'-dihydroxy-4,4'-diaminodiphenylsulfone 3,3'-disulfo-4,4'-diaminodiphenylsulfone, 3,3'-diethyl-4,4'-diaminodiphenylpropane, 3,3'-dimethoxy-4,4'-diaminodiphenylpropane, 3,3'-dibromo-4,4'-diaminodiphenylpropane, 3,3'-dichloro-4,4'-diaminodiphenylpropane, 3,3'-dicarboxy-4,4'-diaminodiphenylpropane, 3,3'-dihydroxy-4,4'-diaminodiphenylpropane, 3,3'-disulfo-4,4'-diaminodiphenylpropane, 3,3'-dimethyl-4,4'-diaminobenzophenone, 3,3'-dimethoxy-4,4'-diaminobenzophenone, 3,3'-dichloro-4,4'-diaminobenzophenone, 3,3'-dibromo-4,4'-diaminobenzophenone, 3,3'-dicarboxy-4,4'-diaminobenzophenone, 3,3'-dihydroxy-4,4'-diaminobenzophenone, 3,3'-disulphodiaminobenzophenone, 3,3'-diaminodiphenylmethane, 3,3'-diaminodiphenylether, 3,3'-diaminodiphenylsulfide, 3,3'-diaminodiphenylsulfone, 3,3'-diaminodiphenylpropane, 3,3'-diaminobenzophenone, 2,4-diaminotoluene, 2,6-diaminotoluene, 1-isopropyl-2,4-phenylenediamine, 2,4-diaminoanisole, 2,4-diaminomonochlorobenzene, 2,4-diaminofluorobenzene, 2,4-diaminobenzoic acid, 2,4-diaminophenol, and 2,4-diaminobenzenesulfonic acid, and phenylene diamines.

The term bis-maleimide within the scope of the formula is meant to include B-staged prepolymers of bis-maleimides when $n$ is O, e.g., N,N'-p-phenylene-bis-maleimide. Other suitable bis-maleimides which can be used when n is O are N,N'-meta-phenylene-bis-maleimide, N,N'4,4'-diphenyl-methane-bis-maleimide, N,N'-4,4'-diphenylether-bis-maleimide, N,N'-4,4'-diphenylsulphone-bis-maleimide, N,N'-m-xylylene-bis-maleimide and N,N'-4,4'-diphenylcyclohexane-bis-maleimide. These prepolymers polymerize under the influence of the alkali metal salts of Bronsted acids the same as the bis-maleimide oligomers shown in the formula.

In carrying out the process, the bis-maleimide is heated in the presence of a catalytic amount (usually 0.01 to 5% by weight of the bis-maleimide and preferably about 1 to 5%) of an alkali metal salt of a Brönsted acid. The Brönsted acid salt catalyst used is an alkali metal (Na, K and Li) salt of an organic Brönsted acid having a $pk_a$ in the range of about 4 to 6, an alkali metal (Na, K and Li) cyanide or an alkali metal (Na, K and Li) carbonate. A preferred catalyst is a neutralized alkali metal salt of a monocarboxylic acid or dicarboxylic acid.

The use of the alkali metal salt catalyst is advantageous in that it eliminates the need for diamine for effective polymerization and it can result in lower polymerization temperatures. The catalyst is most preferably an alkali metal (usually sodium or potassium) salt of a monocarboxylic acid or dicarboxylic acid having 2 to 12 carbon atoms, such as acetic acid, propionic acid and butyric acid. While the higher molecular weight monocarboxylic acids are not preferred, they are useful because of their usual solubility in organic solvents. Other useful catalysts are alkali neutralized dicarboxylic acids such as oxalic acid, malonic acid, succinic acid, glutaric acid, adipic acid, maleic acid, fumaric acid, itaconic acid, glutaconic acid. Sodium acetate and disodium maleate are preferred catalysts.

Representative organic Brönsted acids and their appropriate $pk_a$ values are as follows:

| Organic Acid | $pk_a$ |
|---|---|
| Acetic | 4.75 |
| Propionic | 4.87 |
| Butyric | 4.81 |
| i-Butyric | 4.84 |
| Heptanoic | 4.89 |
| Glutaric (2) | 5.41 |
| Fumaric | 4.44 |
| Benzoic | 4.19 |
| Succinic (1) | 4.16 |
| Ethylbenzoic | 4.35 |
| Ethylphenylacetic | 4.37 |
| Adipic | 4.43 |
| Ascorbic | 4.10 |
| Gamma chlorobutyric | 4.00 |
| Maleic (2) | 6.07 |
| Malic (2) | 5.11 |
| m-methyl cinnamic | 4.44 |
| o-phthalic | 5.51 |
| m-phthalic | 4.60 |
| p-phthalic | 4.82 |
| Oxalic | 4.19 |
| Malonic (2) | 5.69 |

In addition to the catalyst, it is preferred that the polymerization be conducted in the presence of an activator for the catalyst. The activator can be used at any useful concentration but ordinarily a concentration of 0.01 to 5%, based on the weight of bis-maleimide, is sufficient with about 1 to 5% being preferred.

The activator is an aprotic organic compound having a dielectric constant between about 35 and 45. Representative aprotic compounds are N,N-dimethylformamide, N,N-diethylformamide, N,N-dimethylmethoxyacetamide, N-methyl caprolactam, caprolactam, N,N-dimethylacetamide, N,N-diethylacetamide, dimethyl sulfoxide, N-methyl-α-pyrrolidone, tetramethylurea, hexamethylphosphoramide, tetramethylene sulfone, N,N,N',N'-tetramethyl-α-ethylmalonamide, N,N,N',N'-tetramethylglutaramide, N,N,N',N'-tetramethylsuccinamide, thiobis(N,N-dimethylacetamide), bis(N,N-dimethylcarbamylmethyl)-ether, N,N,N',N'-tetramethylfuraramide, methylsuccinonitrile, N,N-dimethylcyanoacetamide, N,N-dimethyl-β-cyanopropionamide, N-formyl-piperidine and butyrolactone.

Of the activators, dimethylacetamide is most preferred. Other preferred activators are diemethylformamide, N-methyl pyrrolidone, dimethyl sulfoxide, butyrolactone and caprolactam.

The temperature for polymerizing the bis-maleimides can vary over a wide range and will depend on the particular bis-maleimide used and the mode of polymerization. For the preferred melt polymerization, temperature from the melting point to 350°C. can be used; however, temperatures over about 250°C. generally tend to be too high to be satisfactory. Thus, it is preferred to use bis-maleimides having low melting points so that polymerization temperatures in the range of about 150° to 275°C. can be used. When the bis-maleimides are polymerized in admixture with an organic solvent such as dimethylacetamide, lower polymerization temperatures have been noted, i.e., on the order of 80° to 100°C. and at the reflux temperature of the particular organic solvent used.

I have also discovered that mono-maleimides of the formula

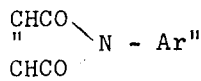

wherein Ar'' is an aromatic moiety characterized by benzenoid unsaturation containing six to ten carbon atoms, e.g. phenyl, tolyl, xylyl, naphthyl and halogenated derivatives thereof, e.g. the chlorides, bromides and fluorides, may be used to lower the melting points and the polymerization temperatures of the bis-maleimides of this invention, and to simultaneously copolymerize with the bismaleimides. The monomaleimides may be used up to 1 mole per mole of bis-maleimides without serious loss to the thermal stability; and where very high thermal stability is not too critical, the ratio of 3 moles of monomaleimide to bis-maleimide can be used. For most applications the preferred ratio is 0.1 to 5 moles of mono to 1 of bismaleimide.

The polyamides prepared by the present process are useful as coating compositions for any substrates, particularly as wire coatings. Other uses are as impregnants for fabrics and as film or fiber formers. The bismaleimide powders can be molded or otherwise formed into shaped articles and polymerized in the shaped or molded form. Laminated structures can also be formed using the bis-maleimides in liquid or in powder form.

The invention can be further understood by the following examples in which parts and percentages are by weight unless otherwise given.

EXAMPLE 1 a. Synthesis of 4',4''-Oxy-(dimaleanitic acid). Reaction of Maleic Anhydride and ODA (5:1).

A warm solution (~50°C.) of 10.012 g. (0.05 mole) of oxydianiline (ODA) in 35 ml. of DMAC was added to a sollution of 24.5 g. (0.25 mole) of maleic anhydride in 50 ml. of DMAC. The resulting yellow solution was heated on a steam bath for one-half hour. Then toluene was added to a point where the solution just became hazy (~300 ml.). After cooling at ambient temperature overnight, the solid was filtered off, washed with DMAC and dried to give 13.584 g. (68.5%) of yellow crystals, m.p. 223°–224°C. (dec. with evolution of a gas), carboxyl number found, 1.998; theoretical, 2.00. An additional quantity of crude product, 5.15 g. (25% was recovered by concentration of the filtrate.

A small sample was recrystallized from DMAC-toluene to give bright yellow crystals, m.p. 226°–227°C. (dec); DTA m.p. (corrected) 220°C. Its infrared spectrum was consistent with its hemiamic acid structure.

Analysis: Calc'd. for $C_{20}H_{16}N_2O_7$:
    C, 60.60; H, 4.07; N, 7.07; O, 28.26.
Found: C, 60.87; H, 4.37; N, 6.94; O.

b. Synthesis of N,N'-(oxy-di-p-phenylene)-dimaleimide (OPDM). Ring Closure of 4',4''-Oxy-(dimaleanilic acid).

In a 250 ml. round-bottom flask, equipped with a magnetic stirrer, condenser and thermometer, was placed 7.927 g. (0.02 mole) of 4',4''-oxy-(diamaleamic acid) in 100 ml. of acetic anhydride. The temperature was raised to 85°C. and solution did not occur. Then 0.164 g. (0.002 mole) of sodium acetate was added and solution occurred within 10 minutes. Heating and stirring at 85°–90°C. was continued for 1½ hours, during the course of which the color of the solution changed from yellow to orange.

After cooling to room temperature, the solution was poured onto approximately 500 g. of ice-water. After stirring for 2 hours, the solid was filtered off, washed with water and dried, to give 5.788 g. (80.3%) of a yellow solid, m.p. 160°–162°C. (dec.).

Recrystallization from toluene-hexane gave a yellow powder, m.p. 163°–165°C. (dec.); DTA m.p. 165°C. Its infrared spectrum was consistent with a dimaleimide structure.

Analysis: Calc'd. for $C_{20}H_{12}N_2O_5$:
    C, 66.66; H, 3.36; N, 7.78; O, 22.20.
Found: C, 66.42; H, 3.71; N, 7.85; O.

Melt polymerization data for this bis-maleimide is shown in Table I and TGA data is shown in Table II.

EXAMPLE 2 a. Preparation of N,N'[1,3-Di(3-aminophenoxy)benzene] dimaleamic Acid. Reaction of Maleic Anhydride and DAPB-3,3 (2:1).

To a solution of maleic anhydride (10.056 g., 0.1026 mole) in 50 ml. of benzene was added a solution of 1,3-di(3-aminophenoxy)benzene (5.001 g., 0.0171 mole) in 25 ml. of DMAC. The resulting solution was refluxed for 30 hours. After cooling, the benzene was removed on a rotary flash evaporator and the resulting DMAC-solution poured onto approximately 75 g. of ice-water. After stirring until the ice melted, the yellow solid was filtered off, washed well with water and vacuum-dried at 85°C. for 2 ½ days to give sample A, 7.41 g. (89%), m.p. 165°–169°C. (dec.). The acid number of A was determined by potentiometric titration to be 1.97 (theoretical 2.00). Its infrared spectrum was consistent with a hemiamic acid structure.

b. Preparation of N,N'-[1,3-di-(3-aminophenoxy)benzene] dimaleimide (APDM). Ring Closure of N,N'-[1,3-di-(3-aminophenoxy)benzene]-dimaleamic Acid.

In a 25-ml. three-neck, round-bottom flask equipped with a magnetic stirrer, condenser and thermometer was placed N,N'-[1,3-di-(3-aminophenoxy)benzene]-dimaleamic acid (0.488 g., 0.001 mole) and 10 ml. of acetic anhydride. The mixture was heated to 80°–90°C. and this temperature was maintained for 30 minutes, during which time solution was nearly complete. Then sodium acetate (0.008 g., 0.0001 mole) was added and heating at 80°–90°C. with stirring was maintained for 2 hours, during which time the color of the solution changed to a dark brown. The reaction mixture was cooled, filtered, and added to 50 g. of ice-water with stirring, giving a dark oil. After stirring for about 8 hours, the oil had become much lighter in color and partially solidified. The water was decanted and fresh water (75 ml.) was added. After stirring for 48 hours a fine yellow solid had formed. The solid was filtered off, washed with water and dried in a vacuum oven to give (APDM) 0.3999 g. (86.6% m.p. 121°–125°c.

APDM was soluble in dioxane and tetrahydrofuran but insoluble in heptane, cyclohexane and benzene.

Analysis: Calc'd. for $C_{26}H_{16}N_2O_6$:
C, 69.02; H, 3.56; N, 6.19; O, 21.21.
Found: C, 68.50; H, 3.41; N, 5.93; O.

Melt polymerization data for this bis-maleimide is shown in Table I and TGA data shown in Table II.

EXAMPLE 3 a. Synthesis of 4′,4″-Sulfonyl-(dimaleanilic acid). Reaction of Maleic Anhydride and SDA-4,4 (5:1). C.)

In a 500-ml. flask was placed 24.5 g. (0.25 mole) of maleic anhydride and 50 ml. of DMAC. After heating on a steam bath to dissolve the maleic anhydride, a warm solution (~50°C.)k of 4,4′-sufonyldianiline (SDA) (12.42 g., 0.05 mole) in a steam bath for one-half hour. Then toluene (~400 ml.) was added until the solution just became hazy. After cooling at ambient temperature overnight, the solid was filtered off, washed with toluene, and dried to give 20.50 g. (92%) of a white solid, m.p. (Fisher-Johns) 215°–220°C.; carboxyl number found, 1.98, theoretical, 2.00.

A small sample was recrystallized from DMAC-toluene to give white crystals, m.p. (Fisher-Johns) 214°–215°C.; DTA, m.p. 217°C., lit m.p. 207°C. Its infrared spectrum was consistent with a hemiamic acid structure.

b. Synthesis of N,N′-(sulfonyl-p-phenylene)-dimaleimide (SPDM).

In a 250-ml. round-bottom flask, equipped with a magnetic stirrer, a condenser and a thermometer, was placed 8.889 g. (0.02 mole) of 4′,4″-sulfonyl-(dimaleanilic acid), and 100 ml. of acetic anhydride. The temperature was raised to 80°C.; solution did not occur. Then 0.164 g. (0.002 mole) of sodium acetate was added; solution occurred within 5 minutes and the color changed from white to yellow. Heating and stirring at 85°–90°C. was continued for 1 ½ hours. After cooling to room temperature, the solution was added to approximately 600 ml. of ether and refrigerated overnight. The solid was filtered off, washed with ether and dried, to give 5.554 g. (68%) of a cream-colored product, m.p. (dec.) 225°–240°C. An additional amount, 1.85 g. (22.6%) of crude product was recovered by concentration of the filtrate.

Recrystallization from toluene-heptane gave a white solid, m.p. 250°–252°C.; DTA m.p. 249°C., with a broad shoulder before a sharp melting point inflection (lit. m.p. 255°–258°C.). Its infrared spectrum was consistent with a dimalimide structure.

Analysis: Calc'd. for $C_{20}H_{12}N_2O_6S$:
C, 58.82; H, 2.96; N, 6.86; O, 23.51; S, 7.85.
Found: C, 59.53; H, 3.26; N, 6.64; O, 23.37; S.

This bis-maleimide melt polymerized at 265°C. using 1% sodium acetate as catalyst in 1 to 2 minutes. TGA data is shown in Table II.

EXAMPLE 4

Preparation of Maleimide-Terminated Polyimide (BTMI-1). Reaction of BTCA, ODA and Maleic Anhydride (1:2:2).

In a 100-ml. three-neck, round-bottom flask equipped with a magnetic stirrer, condenser, and nitrogen inlet was placed ODA (4.004 g., 0.02 mole) in 15 ml. of DMAC. After warming to 40°C., a solution of 1.961 g. (0.02 mole of maleic anhydride in 15 ml. of DMAC was added over 10 minutes, forming a red solution. The solution was heated at 95°–100°C. for 1 hour, during which time the color became yellow. Then, a solution of 3,3′,4,4′-benzophenonetetracarboxylic acid dianhydride (BTCA) (3.222 g., 0.01 mole) in 20 ml. of DMAC was added, and the solution was heated at 95°–100°C. for 45 minutes. The yellow solution became light red. Then 15 ml. (approximately 0.16 mole) of acetic anhydride was added and the solution was refluxed at 140°–145°C. for 1 hour. The color of the reaction mixture darkened to a chocolate brown and copious precipitate was present at the end of the reflux period. Then the reaction was cooled to 70°C. and 0.164 g. (0.002 mole) of sodium acetate was added, following which the temperature was raised to 85°–90°C. for 2 hours. After cooling, the reaction mixture was poured onto 150 g. of ice-water and refrigerated overnight. The solid was filtered off, washed well with water and vacuum-dried at 100°C. to yield 8.636 g. (102%) of a brown solid (A), whose infrared spectrum was consistent with that expected for the compound. The product was soluble in hot m-cresol, partially soluble in hot DMAC and hot sulfolane.

Sample A partially softened at 100°C., began to melt at 230°C., but rehardened at once and did not resoften to 300°C. Sample A was then dried at 200°C. for 12 hours to give B, 8.384 g. (98%). Sample B softened at 150°C., partially melted at 165°C., was mostly molten by 220°C., and rehardened at 290°C. A small sample was dried at 300°C. in air for 3 days, after which it did not melt or soften up to 300°C.

Analysis: Calc'd. for $C_{49}H_{26}N_4O_{11}$:
C, 69.50; H, 3.10; N, 6.62; O, 20.79.
Found (B): C, 67.40; H, 2.55; N, 7.39; O.

When melt polymerized according to the procedure described after Example 7, BTMI-1 cured in 1 minute at 350°C. At temperatures near or under the melting point range of 245°–300°C., poor curing occurred.

EXAMPLE 5 a. Preparation of Maleamic Acid-Terminated

Oligomeric Polyimide (BTMA-1). Reaction of BTCA, ODA and Maleic Anhydride (1:2:2).

In a m-cresol:benzene azotropic apparatus was placed oxydianiline (ODA) (4.004 g., 0.02 mole) in 15 ml. of m-cresol and 10 ml. of benzene. After warming to 40°C., a solution of maleic anhydride (1.961 g., 0.02 mole) in 15 ml. of m-cresol was added to give a red solution, which was heated at 90°–100°C. for 1 hour. A yellow precipitate soon formed which did not redissolve. Then BTCA (3.222 g., 0.01 mole) in 35 ml. of m-cresol was added. The temperature was maintained at 90°–100°C. for 1 hour. Solution did not occur. Then the temperature was raised to approximately 110°C. (reflux) and maintained for 1 ½ hours. No water was collected in the Dean-Stark trap. Then the reaction mixture was cooled, the solvent removed on a rotary flash evaporator and the residue was vacuum-dried at 150°C. for 24 hours to yield the hemiamic acid, 8.7088 g. (95%). The product was partially soluble in hot m-crsol and was insoluble in DMAC, sulfolane and acetic anhydride.

Analysis: Calc'd. for (hemiamic acid) $C_{49}H_{30}N_4O_{13}$:
C, 66.66; H, 3.43; N, 6.30; O, 23.56.
Found: C, 66.60; H, 3.55; N, 6.46; O.

Its TGA in air shows a break at 315°C. and an inflection point at 415°C. compared to 350°C and 570°C. respectively for its corresponding completely cyclized imide BTM 1-2.

When an equivalent amount of an aromatic 1,2-dicarboxylic acid anhydride, e.g., phthalic anhydride, tetrachlorophthalic anhydride, etc. is substituted for the maleic anhydride in the control, a completely cyclized polyimide is obtained of the structure:

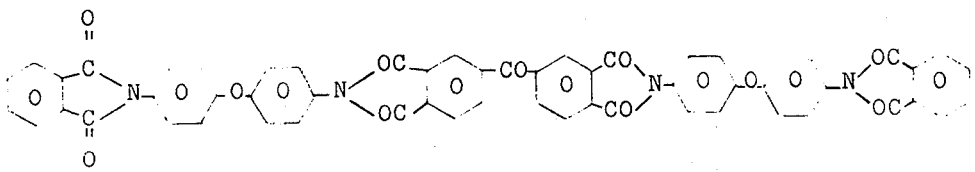

b. Preparation of the Meleimide-Terminated Oligomeric Polyimide (BTMI-2) Ring Closure of BTMA-1 using Acetic Anhydride and Sodium Acetate in m-Cresol.

In a 100-ml, three-neck, round-bottom flask equipped with a thermometer, condenser and magnetic stirrer was placed 2.000 g. (0.0022 mole) of BTMA-1 in 15 ml. of m-cresol. The temperature was raised to 70°C. and 0.510 g. (0.005 mole) of acetic anhydride and 0.041 g. (0.0005 mole) of sodium acetate were added. Heating at 70°–80°C. was maintained for 4 hours. The reaction mixture darkened slightly and solution occured but not completely. After cooling, the mixture was poured onto approximately 50 g. of ice-water, stirred for about 1 hour and filtered. The solid residue was washed with water and vacuum-dried at 110°C. for 24 hours to give 1.804 g. of a yellow powder which partially softened at 245°C., partially melted with pressure at about 260°C.

Analysis: Calc'd. for $C_{49}H_{26}N_4O_{11}$:
C, 69.50; H, 3.10; N, 6.62; O, 20.79.
Found: C, 69.88; H, 3.66; N, 6.69; O.

When melt polymerized according to the procedure described after Example 7, BTMI-2 cured in 3 to 5 minutes at temperatures of 275°–300°C. At 265°C., poor curing occurred.

EXAMPLE 6

Preparation of Maleimide-Terminated Oligomeric Polyimide (BTMI-3). Reaction of BTCA, SDA-3,3 and Maleic Anhydride (8:9:2).

In the m-cresol:benzene azeotropic apparatus, there was placed SDA-3,3 (2.2320 g. (0.009 mole) in 15 ml. of m-cresol and 10 ml. of benzene. After warming to approximately 50°C., a solution of maleic anhydride (0.1961 g., 0.002 mole) in 15 ml. of m-cresol was added over about one-half hour. The resulting solution was heated at 100°C. for 1 hour, and then a solution of BTCA (2.5778 g., 0.008 mole) in 20 ml. of m-cresol was added. The solution was heated to reflux, and over 1½ hours 0.27 ml. of water was collected. After cooling, the reaction mixture was concentrated on a rotary flash evaporator and the residue wav vacuum-dried at 150°C. for 30 hours. The residue was then dissolved in 30 ml. of m-cresol at 70°–80°C. and acetic anhydride (0.4686 g., 0.00261 mole) and sodium acetate (0.0215 g., 0.000261 mole) were added. The solution was heated and stirred at 70°–80°C. for 4 hours. The oligomer was then precipitated with methanol and was washed three times with hot methanol to yield, after vacuum-drying at 110°C., 4.6 g. (94%) of a yellow solid whose infrared spectrum was consistent with the structure of the expected compound. BTMI-3 began to melt at 260°C., but did not completely melt by 300°C. It was soluble in hot m-cresol, swelled considerably in hot DMAC and hot sulfolane.

The TGA in air of BTMI-3 showed a weight loss of approximately 7% below 300°C., due to retained m-cresol. A small sample was dried at 300°C. for 1 hour to give BTMI-3-H300, whose TGA in air shows a break at 400°C. and an inflection point in excess of 500°C.; at approximately 535°C.

Analysis: Calc'd. for $C_{252}H_{124}N_{18}O_{62}S_9$:
C, 64.61; H, 2.67; N, 5.38; O, 21.18; S, 6.16.
Found: C, 64.34; H, 2.95; N, 5.43; O, - - -; S.

When an equivalent amount of an aromatic 1,2-dicarboxylic acid anhydride, e.g., phthalic anhydride, tetrachlorophthalic anhydride, etc. is substituted for the maleic anhydride in the control, a completely cyclized polyimide is obtained.

BTMI-3 melt cured in a manner comparable to BTMI-1.

EXAMPLE 7

Preparation of Maleimide-Terminated Oligomeric Polyimide (BTMI-4). Reaction of BTCA, SDA-4,4 and Maleic Anhydride (8:9:2).

In the m-cresol:benzene azeotropic apparatus there was placed SDA-4,4 (2.2320 g., 0.009 mole) in 15 ml. of m-cresol and 10 ml. of benzene. After warming to approximately 50°C., a solution of maleic anhydride (0.1961 g., 0.002 mole) in 15 ml. of m-cresol was added over about one-half hour. The resulting solution was heated at 100°C. for 1 hour, and then a solution of BTCA (2.5778 g., 0.008 mole) in 20 ml. of m-cresol was added. The solution was heated to reflux and over 1½ hours 0.27 ml. of water was collected. After cooling, the reaction mixture was concentrated on a rotary flash evaporator and the residue was vacuum-dried at 150°C. for 30 hours. The residue was then dissolved in 30 ml. of m-cresol at 70°–80°C. and acetic anhydride 90.4685 g., 0.00261 mole) and sodium acetate (0.0215 g., 0.000261 mole) were added. The solution was heated and stirred at 70°–80°C., for 4 hours. The oligomer was then precipitated with methanol and was washed 3 times with hot methanol to yield, after vacuum-drying at 110°C., 4.3 g. (88%) of a yellow solid whose infrared spectrum was consistent with that expected for the compound, and very similar to that of BTMI-3. BTMI-4 began to melt at 255°C., but did not completely melt by 300°C. It was soluble in hot m-cresol, DMAC and sulfolane.

The TGA in air of BTMI-4 showed a loss of approximately 7% below 300°C., due to retained solvent. A small sample was dried at 300°C., for 1 hour to give BTMI-4-H300 whose TGA in air is identical with that of BTMI-3-H300 and showed an inflection point in excess of 500°C.

Analysis: Calc'd. for $C_{252}H_{124}N_{18}O_{62}S_9$:
C, 64.61; H, 2.67; N, 5.38; O, 21.18; S, 6.16.
Found: C, 64.35; H, 2.81; N, 5.53; O, - - -; S.

The same oligomeric polyimide is obtained if after 1½ hours of reaction, the benzene is eliminated by distillation and the cyclization continued in the original m-cresol by the addition of the acetic anhydride and sodium acetate.

When an equivalent amount of an aromatic 1,2-dicaboxylic acid anhydride, e.g., phthalic anhydride, tetrachlorophthalic anhydride, etc. is substituted for the maleic anhydride in the control, a completely cyclized polyimide is obtained.

BTMI-4 melt cured in a manner comparable to BTMI-1.

The following procedure was used to polymerize the monmers and oligomers of Examples 1 to 7 as melts. First, a finely Wig-L-jig powdered sample of the monomer was spread uniformly over a thin, curcular glass microscope-cover glass. When the test was to be performed in the presence of air, it was left uncovered and open to the atmosphere. In comparative tests to be performed in the relative absence of air, the sample was covered with a similar glass placed directly on the sample. In those cases where sodium acetate, NaOAc, was used as a catalyst, it was first mixed in a dry condition with the dimaleimide and blended in a Wig-L-jig apparatus for at least a minute. In the other cases, where DMAC was added to the catalyzed mixture, a capillary was used to add the trace amount of DMAC to the powdered mixture. Then, the cover glass containing the sample was placed in the recess in the stage of a Fisher-Johns apparatus preheated initially to 15°C. above the melting point of the specific dimaleimide under test and the total time in minutes for the product to melt and convert to an infusible condition noted. If melting or curing did not occur, the behavior of the material was observed and recorded. The procedure was then repeated at a number of higher temperatures. The data obtained are summarized in Table I, and typical TGA data in air on samples cured at 300°C. are given in Table II. TGA was run on a Du Pont 900 at 10°C./min.

When an equivalent amount of sodium cyanide or sodium carbonate is substituted for sodium acetate, similar cure rates are obtained.

The same results are obtained when the activator nd catalysts are premixed before addition to the bismaleimide, or if the catalyst is mixed with one portion of the bis-maleimide and the activator with a second portion of the bis-maleimide after which the first and second portions are blended to uniformity and cured.

TABLE I

Data on Melt Polymerizations of Dimaleimides
Polymerization Conditions

| Dimaleimide used; m.p. °C. | Block Temp. °C. | Covered | Open to Air | NaOAc % | Other | Cure time min. or Observation |
|---|---|---|---|---|---|---|
| OPDM 165 Ex. 1 | 180 | — | x | — | — | no cure at 20 min., viscous bodied polymer which cured 1 min. with 1% NaOAc |
|  | 265 | — | x | — | — | 5 |
|  | 180 | x | — | 1 | — | 5 |
|  | 180 | — | x | 1 | — | 5 |
|  | 180 | — | x | 1 | trace DMAC | 3 |
|  | 265 | — | x | 1 | — | 2 |
| APDM range 121–125 Ex. 2 | 140 | x | — | — | — | viscous melt, no cure at 30 min. |
|  | 180 | x | — | — | — | very viscous, no cure at 30 min. |
|  | 265 | x | — | — | — | 3 |
|  | 265 | — | x | — | — | rubbery, cure in 15 min. |
|  | 140 | x | — | 3 | — | very viscous, no cure at 30 min. |
|  | 140 | x | — | 3 | trace DMAC | 30 |
|  | 180 | x | — | 3 | — | 15 |
|  | 180 | — | x | 3 | — | 20 |
|  | 265 | x | — | 3 | — | 1 |
|  | 265 | — | x | 3 | — | 1 |

TABLE II

TGA DATA in Air on Dimaleimide Polymers

| Dimaleimide Polymer | Break °C. | Inflection °C. | Percent Residue at °C. | | | | | | | |
|---|---|---|---|---|---|---|---|---|---|---|
| | | | 300 | 400 | 500 | 600 | 700 | 800 | 900 | 1000 |
| OPDM Ex. 1 | 400 | 500 | 100 | 100 | 95 | 63 | 0 | 0 | 0 | 0 |
| SPDM Ex. 3 | 370 | 510 | 100 | 98 | 94 | 43 | 0 | 0 | 0 | 0 |
| BTMI-2 Ex. 5 | 350 | 570 | 100 | 99 | 96 | 77 | 0 | 0 | 0 | 0 |
| BTMI-3 Ex. 6 | 360 | 560 | 100 | 99 | 98 | 88 | 0 | 0 | 0 | 0 |
| BTMI-4 Ex. 7 | 400 | 600 | 100 | 100 | 98 | 88 | 0 | 0 | 0 | 0 |
| APDM Ex. 2 | 300 | 415 | 100 | 98 | 77 | 50 | 0 | 0 | 0 | 0 |

EXAMPLE 8 a. B-Staging of OPDM in Xylene

In a 25-ml. flask equipped with a magnetic stirrer, a reflux condenser, a heating mantle and a gas inlet tube, there was placed 0.500 g. of OPDM and 10 ml. of xylene and a moderate stream of air passed through the solution. Then the solution was heated at reflux for 1½ hours, while air was passed through the yellow solution; after which the solution was concentrated on a rotary evaporator, leaving a yellow powder which was dried in a vacuum oven at 100°C. for 72 hours, leaving 0.506 g. (100%). When heated on a Fisher-Johns melting point apparatus, starting at ambient temperature, it softened at 100°C., completely melted at 160°C., and hardened at 250°C.

The product is soluble in hot toluene, methyl ethyl ketone, ethyl acetate, m-cresol, DMAC, and slightly soluble in 95% ethyl alcohol.

When placed on a Fisher-Johns apparatus, preheated at 160°C., and when exposed to air, it melted and did not harden in 15 minutes; but when it was covered and protected from air, it melted and did not harden in 30 minutes. However, when mixed with small amounts of sodium acetate and heated while exposed to air at 160°C., it hardened in 10 minutes.

b. B-Staging of OPDM in DMAC

The same apparatus and procedure in (a) above was used except that 10 ml. of DMAC was used as the solvent instead of xylene. The solution of OPDM in DMAC was heated at reflux temperature while air was passed slowly through the solution. After 1 hour of reaction, the solution was concentrated on a rotary flash evaporator and vacuum-dried at 100°C. for 72 hours, yielding 0.506 g. (~100%) of a brown glassy resin. When heated on a Fisher-Johns apparatus, starting at ambient temperature, it softened at 80°C., resinified at 95°C., and hardened at 230°C. The glassy resin was soluble in hot DMAC, m-cresol; slightly soluble in hot methyl ethyl ketone; and insoluble in hot toluene, hot 95% ethyl alcohol and ethyl acetate.

When placed on a fisher-Johns apparatus, preheated at 160°C., and exposed to air, it melted and did not harden in 15 minutes; when it was protected from air, it melted and did not harden in 30 minutes, but when it was mixed with a small amount of sodium acetate wet with DMAC, it cured immediately.

EXAMPLE 9

Polymerization of Dioxane Recrystallized N,N'-p-phenylenedimaleimide in the Presence of Disodium Maleate in DMAC.

Dioxane-recrystallized N,N'-p-phenylenedimaleimide (0.5841 g.) was mixed with 6.2291 g. of distilled dimethylacetamide in a round-bottom flask, equipped with a condenser and magnetic stirrer. To this mixture was added 0.0166 g. of disodium maleate (approximately 3% of the weight of diimide). The mixture was stirred under dry nitrogen and heated. At room temperature the mixture was bright yellow, but as it was heated the color turned to mustard-yellow, and then to brownish-red. At 80°C. the mixture became a deep wine-red colored solution. After 45 minutes at 86°–90°C. the material gelled.

The gel was broken up and washed with 150 ml. of distilled water. The resulting solid was filtered off and dried overnight in a vacuum oven at 100°C. The yield of product was 0.5070 g. (86.9%), and its color was brown-red, insoluble in DMAC; its infrared spectrum confirmed that it was poly-N,N'-p-phenylenedimaleimide.

As a control, N-phenylmaleimide and 3% sodium acetate based on the weight of N-phenylmaleimide were heated at 100°C. for 15 minutes and cooled. A brittle, resinous mass was obtained whose molecular weight was about 850, corresponding approximately to a pentamer.

EXAMPLE 10

Polymerization of Recrystallized N,N'-p-phenylenedimaleimide in the Presence of Disodium N,N'-p-phenylenedimaleamate in DMAC.

Using the same apparatus and procedure as in the disodium maleate experiment of Example 9, 0.4837 g. of dioxane recrystallized N,N'-p-phenylenedimaleimide was stirred with 4.8016 g. distilled dimethylacetamide and 0.0145 g. of disodium N,N'-p-phenylenedimaleamate. The same color changes and solution behavior as in the disodium maleate experiment were observed. Gel time was 90 minutes; the yield was 0.4354 g. (90%) of a brown-red product insoluble in hot DMAC. Its infrared spectrum was identical to that of poly-(N,N-p-phenylenedimaleimide).

EXAMPLE 11

Polymerization of dioxane Recrystallized N,N'-p-phenylenedimaleimide in the Presence of Sodium Acetate in DMAC.

A. In a 25 ml. round-bottom flask, equipped with a magnetic stirrer and condenser, were placed 0.10 g. of dioxane recrystallized N,N'-p-phenylenedimaleimide, 0.003 g. of sodium acetate (3% by weight) and 2 ml. of dimethylacetamide. The red solution was heated at 100°C. for 6½ hours with a large increase in viscosity being noted. Gelation did not occur, however, within this time limit. The solution was cooled and 20 ml. of methanol were added. After standing overnight, the resulting red solid was filtered off, washed with methanol, and dried to give 0.0856 g. (85.6%) of product, m.p.>300°C. The product was insoluble in hot DMAC. Its infrared spectrum (KBr disc) was identical with that of poly-(N,N'-p-phenylenedimaleimide). A TGA in nitrogen at 10°C./min. showed an inflection point at 480°C., and 47% residue at 800°C.

Heating of N,N'-p-phenylenedimaleimide in Acetic Acid in the Presence of Sodium Acetate B. As a control, N,N'-p-phenylenedimaleimide (1.0010 g., R. G. Aldrich Chemical Co.) was heated in 50 ml. acetic acid at the reflux temperature for 4 hours; trace amounts of material remained undissolved. The hot solution was filtered to remove these solids. Then, 10 mg. of sodium acetate was added to the filtrate and the clear solution heated at reflux for 32 hours. The solution remained clear and yellow. On cooling to room temperature, yellow needles of N,N'-p-phenylenedimaleimide precipitated from the solution which were recovered quantitatively. No evidence of polymerization was observed under these conditions.

EXAMPLE 12

Interrupted Polymerization of N,N'-p-phenylenedimaleimide in DMAC in the Presence of Disodium Maleate (B-Staging).

A mixture of N,N'-p-penylenedimaleimide (268 mg., 1 m.mole), disodium maleate (8 mg.) and 2 ml. of dimethylacetamide were heated under nitrogen at 95°C. for 10 minutes in a 10-ml. ground glass flask equipped with a reflux condenser, heating mantle, etc., to yield red, viscous solution. Then on the addition of 0.5 ml. of acetic acid, the color of the reaction mixture became brown; heating was continued at 100°C. for one hour without the occurrence of gellation. The mixture was cooled to room temperature and poured into 25 ml. of cold water (5°C.), the precipitate isolated by filtration, washed with water and dried to yield 257 mg. of a tan product, A, m.p.>300°C. which was soluble in hot DMAC.

Product A, (120 mg.) was dissolved in 1.5 ml. of DMAC and heated under nitrogen at 150°C., yielding a light red solution which did not gel in the course of one hour. Another sample of product A, 134 mg., and disodium maleate (5 mg.) were dissolved in 1.5 ml. of DMAC and heated under nitrogen at 150°C., gellation occurred in approximately one-half hour; this gel was not soluble in an excess (25 ml.) of DMAC at 150°C.

EXAMPLE 13

Mixed Melts of N-Phenylmaleimide and N,N'-p-Phenylenedimaleimide.

Weighed quantities of carbon tetrachloriderecrystallized N-phenylmaleimide (A) and dioxanerecrystallized N,N'-p-phenylenedimaleimide (B) were placed in a mixing capsule and ground in a Wig-1-jig apparatus for 90 seconds. After mixing, the melting characteristics were observed in a Mel-Temp apparatus.

| Sample No. | Wt of A (Monoimide) g | % | Wt of B (Diimide) g | % | Melting Behavior, °C. |
|---|---|---|---|---|---|
| 1 | 0.0000 | 0.0 | 0.4000 | 100.0 | No melt at 300 |
| 2 | 0.0105 | 25.0 | 0.0319 | 75.0 | Softened at 230 |
| 3 | 0.0174 | 39.3 | 0.0268 | 60.7 | Softened at 205 |
| 4 | 0.0106 | 50.0 | 0.0102 | 50.0 | Softened at 180 |
| 5 | 0.0336 | 75.0 | 0.0110 | 25.0 | Softened in range of 87–140 | when catalytic quantites of sodium acetate and dimethyl acetamide were mixed with samples 2 to 5 inclusive, cured, crosslinked copolymers were readily obtained at temperatures 10° to 20°C. above the temperatures observed for the mixed melts given above. Other vinyl-type monomers such as the methacrylates and styrenes as illustrated in the following example do not copolymerize with the bis-maleimides in the presence of catalytic quantities of the alkali metal salts of the Bronsted acids used in the practice of this invention.

EXAMPLE 14

Polymerization of N,N'-p-phenylenedimaleimide in the Presence of Styrene and Bronsted acid salt.

The diimide (2.68 g. 0.01 mole), 0.02 g of disodium maleate and styrene (2.08 g, 0.02 mole) were dissolved in 25 ml of DMAC and heated to 110°C. for one hour, yielding a gel which was added to 100 ml of methanol and dispersed in a Waring blender and isolated by filtration. It was washed again with 100 ml of methanol and dried, yielding 2.47 g, m.p.>300°C, whose infrared spectrum was identical to that of homopolymerized diimide. Its elemental analysis confirmed that styrene did not copolymerize with the diimide.

Analysis: Calc'd. for $C_{14}H_8N_2O_4$:
C, 62.29; H, 3.01; N, 10.45.
Found: C, 61.35; H, 3.23; N, 10.52.

EXAMPLE 15

B-Staging or Retarded Polymerization of N,N'-p-Phenylenedimaleimide.

Dioxane recrystallized N,N'-p-phenylenedimaleimide (134 mg, 0.5 m.mole) and furan (136 mg, 4 m.moles), disodium maleate (4mg) were added to 1.5 ml DMAC in a 10 ml round-bottom flask equipped with a magnetic stirrer, reflux condenser, oil heating bath, inert gas inlet, etc. A nitrogen atmosphere was introduced into the flask and the mixture heated with stirring. A clear, red colored homogeneous solution formed when the bath temperature reached approximately 80°C. The bath temperature was raised to 95°C., yielding a solution of moderate viscous material which did not increase in viscosity or gel when the heating was continued for 2 additional hours. Then, furan (2 m.moles) was allowed to escape from the reaction mixture by removing the condenser, the condenser reinserted and reflux continued for 1 hour yielding a solution of higher viscosity which did not increase in viscosity on further heating. Then, when the condenser was removed again and the remainder of the furan allowed to escape, a gel was obtained which was insoluble in DMAC.

In a control experiment, in which the same quantities of reagents were used, except that furan was omitted from the reaction mixture, gellation occurred within 1 hour of reaction time.

This example illustrates the B-staging of polymaleimides, specifically the dimaleimides, by controlling the polymerization by means of a reversible Diels-Alder Mechanism using as the donor a diene, a donor whose boiling point at 760 mm pressure is less than 120°C.

What is claimed is:

1. A process for converting a bis-maleimide of the formula:

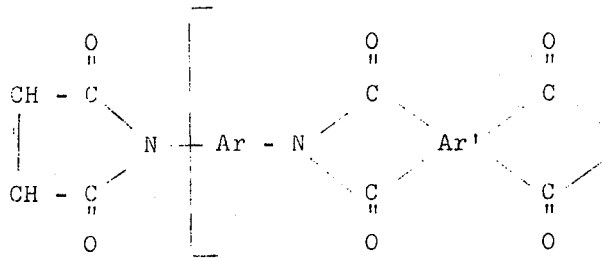

wherein Ar is a divalent aromatic organic radical,

Ar' is a tetravalent aromatic organic radical, the four carbonyl groups being attached directly to separate carbon atoms and each pair of carbonyl groups being attached to adjacent carbon atoms in the Ar' radical, and $n$ is 0 or a positive integer of 1 to 20, to a higher molecular weight polymer comprising: polymerizing said bis-maleimide at a temperature in the range of 85° to 275°C. in the presence of about 0.01 to 5% by weight of the bis-maleimide of an alkali metal salt of a Bronsted acid, said alkali metal salt of a Bronsted acid selected from the group consisting of an alkali metal salt of an organic Bronsted acid having a $pk_a$ in the range of about 4 to 6, an alkali metal cyanide and an alkali metal carbonate.

2. The process of claim 1 wherein the polymerization is conducted in the presence of about 0.01 to 5% by weight of the bis-maleimide of an activator for the catalyst, said activator being an aprotic organic compound having a dielectric constant between about 35 and 45.

3. The process of claim 2 wherein the catalyst and activator are premixed before polymerization.

4. The process of claim 2 wherein the catalyst is mixed with a portion of bis-maleimide and the activator is mixed with another portion of bis-maleimide before polymerization.

5. The process of claim 1 wherein the temperature is in the range of about 150° to 275°C.

6. The process of claim 2 wherein the temperature is in the range of about 150° to 275°C.

7. The process of claim 1 wherein the catalyst is an alkali metal salt of a monocarboxylic acid or dicarboxylic acid.

8. The process of claim 5 wherein the catalyst is an alkali metal salt of a monocarboxylic acid or dicarboxylic acid.

9. The process of claim 2 wherein the aprotic organic compound is selected from the group consisting of dimethylacetamide, dimethylformamide, N-methyl pyrrolidone, dimethyl sulfoxide, butyrolactone and caprolactam.

10. The process of claim 9 wherein the catalyst is an alkali metal salt of a monocarboxylic acid or dicarboxylic acid.

11. The process of claim 1 wherein Ar is selected from the group consisting of

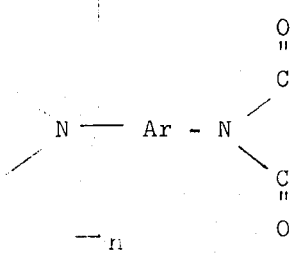

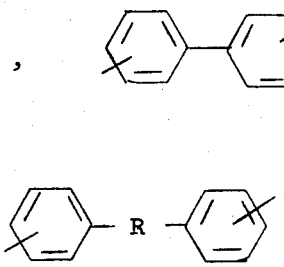

wherein R is alkylene of 1 to 3 carbon atoms, $$-\overset{O}{\underset{\|}{C}}-\ ,\ -O-\ ,\ -S-\ ,\ -CH=CH-\ ,\ \text{and}\ -SO_2-\ ,$$

and Ar' is selected from the group consisting of

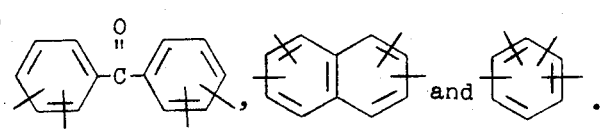

12. A process for converting a bis-maleimide of the formula:

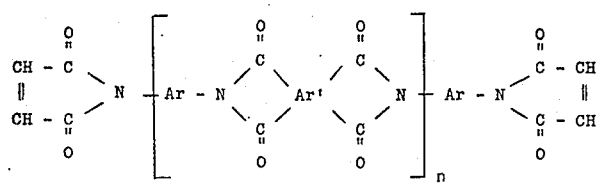

wherein Ar is a divalent aromatic organic radical,

Ar' is a tetravalent aromatic organic radical, the four carbonyl groups being attached directly to separate carbon atoms and each pair of carbonyl groups being attached to adjacent carbon atoms in the Ar' radical, and $n$ is 0 or a positive integer of 1 to 20, to a cross-linked, thermally stable, intractable polymer comprising: melt poymerizing said bis-maleimide in the presence of about 1 to 5% by weight based on the weight of the bis-maleimide, of an alkali metal salt of a monocarboxylic acid or dicarboxylic acid and about 1 to 5% by weight, based on the weight of bis-maleimide, of an aprotic organic compound selected from the group consisting of dimethylactamide, dimethylformamide, N-methyl pyrrolidone, dimethyl sulfoxide, butyrolactone and caprolactam at a temperature in the range of about 85° to 275°C.

13. The process of claim 12 wherein Ar is selected from the group consisting of wherein R is alkylene of 1 to 3 carbon atoms, $-\overset{O}{\underset{\|}{C}}-$, $-O-$, $-S-$, $-CH=CH-$, and $-SO_2-$, and Ar' is selected from the group consisting of 14. The process of claim 13 wherein the salt is sodium acetate or disodium maleate and the aprotic compound is dimethylacetamide.

15. The process of claim 1 wherein the bis-maleimide is dissolved in an organic solvent and polymerized to an ungelled fusible stage soluble in the same solvent.

16. A thermally stable polymer derived from the completely cyclized bis-maleimides according to the process of claim 1.

17. The polymers of claim 16 having a TGA inflection point, measured at 10°C. per minute of at least 400°C.

18. The process of claim 1 wherein the bis-maleimide is polymerized in the presence of 0.1 to 2.5 moles of a monomaleimide per mole of bis-maleimide, said maleimide having the formula wherein Ar" is an aromatic moiety characterized by benzenoid unsaturated containing 6 to 10 carbon atoms and halogenated derivatives thereof selected from the class of chlorine, bromine and fluorine.

19. A copolymer according to the process of claim 18.

20. The copolymer of claim 19 in which the monomaleimide is N-phenylmaleimide.

21. A copolymer of 0.1 to 2.5 moles with one mole of wherein Ar" represents an aromatic moiety characterized by benzenoid unsaturation containing six to ten carbon atoms and halogenated derivatives thereof selected from the class of chlorine, bromine and fluorine, Ar is a divalent aromatic organic radical, Ar' is a tetravalent aromatic organic radical, the four carbonyl groups being attached directly to separate carbon atoms and each pair of carbonyl groups being attached to adjacent carbon atoms in the Ar' radical, and $n$ is 0 or a positive integer of 1 to 20.

* * * * *